US009497016B2

(12) United States Patent
Suzuki et al.

(10) Patent No.: US 9,497,016 B2
(45) Date of Patent: Nov. 15, 2016

(54) DUPLEX LC COMMUNICATION LIGHT DETECTING ADAPTER AND DUPLEX LC COMMUNICATION LIGHT DETECTING STRUCTURE

(71) Applicant: Hitachi Metals, Ltd., Tokyo (JP)

(72) Inventors: Kanako Suzuki, Hitachi (JP); Takao Nishikawa, Itabashi-ku (JP); Toshiyuki Suzuki, Saitama (JP)

(73) Assignee: HITACHI METALS, LTD., Tokyo (JP)

( * ) Notice: Subject to any disclaimer, the term of this patent is extended or adjusted under 35 U.S.C. 154(b) by 42 days.

(21) Appl. No.: 14/677,825

(22) Filed: Apr. 2, 2015

(65) Prior Publication Data

US 2015/0286014 A1    Oct. 8, 2015

(30) Foreign Application Priority Data

Apr. 4, 2014    (JP) .................................. 2014-077918

(51) Int. Cl.
| | |
|---|---|
| *H04L 5/14* | (2006.01) |
| *H04B 10/40* | (2013.01) |
| *G02B 6/38* | (2006.01) |
| *G02B 6/42* | (2006.01) |

(52) U.S. Cl.
CPC .............. *H04L 5/14* (2013.01); *G02B 6/3825* (2013.01); *G02B 6/4287* (2013.01); *H04B 10/40* (2013.01); *G02B 6/4286* (2013.01); *G02B 6/4292* (2013.01)

(58) Field of Classification Search
CPC ........... H04L 5/14; G02B 6/3825; G02B 6/38; G02B 6/4287; G02B 6/42; G02B 6/4292; G02B 6/4286; H04B 10/40
See application file for complete search history.

(56) References Cited

U.S. PATENT DOCUMENTS

| | | | |
|---|---|---|---|
| 8,469,602 B2* | 6/2013 | Kojima | G02B 6/4292 385/67 |
| 9,246,581 B2* | 1/2016 | Suzuki | G02B 6/2852 |
| 2010/0008676 A1 | 1/2010 | Kojima et al. | |

(Continued)

FOREIGN PATENT DOCUMENTS

| | | |
|---|---|---|
| JP | 2009-145676 A | 7/2009 |
| JP | 2010-231082 A | 10/2010 |

(Continued)

*Primary Examiner* — Andrew Jordan
(74) *Attorney, Agent, or Firm* — McGinn IP Law Group, PLLC

(57) ABSTRACT

A duplex LC communication light detecting adapter includes an adapter main body to form two parallel optical transmission lines therein when a duplex LC connector is inserted, the adapter main body including a side in which a light extraction hole is formed, the light extraction hole being located at a vertex of a isosceles triangle having a base that is a line segment connecting centers of the two optical transmission lines in a cross section and opened in a direction perpendicular to the line segment, and a sleeve holder formed integrally with the adapter main body to hold a sleeve that houses a ferrule of the duplex LC connector. The sleeve holder includes an opening section that is opened toward the light extraction hole in a range of more than 30 degrees to less than 120 degrees relative to the line segment in a cross section.

7 Claims, 6 Drawing Sheets

(56) References Cited

U.S. PATENT DOCUMENTS

| | | | | |
|---|---|---|---|---|
| 2010/0329604 A1* | 12/2010 | Kojima | ............... | G02B 6/2852 385/31 |
| 2011/0033159 A1* | 2/2011 | Kojima | ............... | G02B 6/4214 385/79 |
| 2015/0286014 A1* | 10/2015 | Suzuki | ............... | G02B 6/3825 398/135 |
| 2015/0288447 A1* | 10/2015 | Suzuki | ............... | H04L 5/14 398/29 |
| 2015/0341111 A1* | 11/2015 | Suzuki | ............... | G02B 6/4215 398/25 |

FOREIGN PATENT DOCUMENTS

| | | |
|---|---|---|
| JP | 2011-013359 A | 1/2011 |
| JP | 2011-013360 A | 1/2011 |
| JP | 2013-228678 A | 11/2013 |

* cited by examiner

DUPLEX LC COMMUNICATION LIGHT DETECTING ADAPTER AND DUPLEX LC COMMUNICATION LIGHT DETECTING STRUCTURE

The present application is based on Japanese patent application No. 2014-077918 filed on Apr. 4, 2014, the entire contents of which are incorporated herein by reference.

BACKGROUND OF THE INVENTION

1. Field of the Invention

The invention relates to a duplex LC communication light detecting adapter and a duplex LC communication light detecting structure that are adapted to visually check a used/unused state of optical transmission line by detecting a communication light.

2. Description of the Related Art

Optical communication-related equipment uses a communication light detection technique which is adapted to check a used/unused state (hereinafter, referred to as "communication state") of an optical transmission line by detecting a communication light in an invisible light range so as to monitor the steadiness of the optical transmission line or to prevent a man-caused erroneous removal of connector.

As an example of the communication light detection technique, a communication light detection structure is known which is adapted to extract as a leak light a portion of communication light transmitting through the optical transmission line, to receive the leak light by a light-receiving element, to thereby detect whether the communication light is transmitted through the optical transmission line or not, and to output the communication state of the optical transmission line so as to allow the operator's visual check (see e.g. JP-A-2009-145676, JP-A-2010-231082, JP-A-2011-013359 and JP-A-2011-013360).

The communication light detecting structure is provided with a communication light detector having a detector main body mounting a light-receiving element and a communication light detecting adapter having an adapter main body on which a light extraction hole for extracting leak light toward the light-receiving element is formed.

In general, a simplex SC (SSC) connector for single core is used for optical communication. Thus, a simplex SC communication light detecting adapter compatible therewith is used for detecting the communication light.

SUMMARY OF THE INVENTION

The simplex SC communication light detecting adapter may not be suitable for high-density packaging which is needed along with increase in information capacity in recent years. Thus, a duplex LC communication light detecting adapter compatible with a duplex LC (DLC) connector for two cores is demanded so as to form two optical transmission lines by one adaptor.

It is an object of the invention to provide a duplex LC communication light detecting adapter and a duplex LC communication light detecting structure that are compatible with the duplex LC connector to thereby form two optical transmission lines and allow the high-sensitivity detection for leak light.

(1) According to one embodiment of the invention, a duplex LC communication light detecting adapter comprises:

an adapter main body to form two parallel optical transmission lines therein when a duplex LC connector is inserted, the adapter main body comprising a side in which a light extraction hole is formed, the light extraction hole being located at a vertex of a isosceles triangle having a base that is a line segment connecting centers of the two optical transmission lines in a cross section and opened in a direction perpendicular to the line segment; and a sleeve holder formed integrally with the adapter main body to hold a sleeve that houses a ferrule of the duplex LC connector, wherein the sleeve holder comprises an opening section that is opened toward the light extraction hole in a range of more than 30 degrees to less than 120 degrees relative to the line segment in a cross section.

In the above embodiment (1) of the invention, the following modifications and changes can be made.

(i) The sleeve holder comprises a light reflecting layer formed on an inner surface thereof.

(ii) The sleeve holder comprises a clip portion to prevent the sleeve from falling off.

(2) According to another embodiment of the invention, a duplex LC communication light detecting structure comprises:

a duplex LC communication light detecting adapter; and a communication light detector removably attached to the duplex LC communication light detecting adapter, wherein the duplex LC communication light detecting adapter comprises:

an adapter main body to form two parallel optical transmission lines therein when a duplex LC connector is inserted, the adapter main body comprising a side in which a light extraction hole is formed, the light extraction hole being located at a vertex of a isosceles triangle having a base that is a line segment connecting centers of the two optical transmission lines in a cross section and opened in a direction perpendicular to the line segment; and a sleeve holder formed integrally with the adapter main body to hold a sleeve that houses a ferrule of the duplex LC connector, wherein the sleeve holder comprises an opening section that is opened toward the light extraction hole in a range of more than 30 degrees to less than 120 degrees relative to the line segment in a cross section, and wherein the communication light detector comprises a detector main body mounting a light-receiving element to be housed in the light extraction hole.

In the above embodiment (2) of the invention, the following modifications and changes can be made.

(iii) The light-receiving element comprises a CAN-type photodiode comprising a can body opened in a light-receiving direction and a light-receiving portion housed in the can body.

(iv) The light-receiving portion is arranged at a position with a distance of not less than 2.8 mm and not more than 3.2 mm from the line segment.

(v) The can body comprises a light reflecting layer formed on an inner surface thereof.

EFFECTS OF THE INVENTION

According to one embodiment of the invention, a duplex LC communication light detecting adapter and a duplex LC communication light detecting structure can be provided that are compatible with the duplex LC connector to thereby form two optical transmission lines and allow the high-sensitivity detection for leak light.

BRIEF DESCRIPTION OF THE DRAWINGS

Next, the present invention will be explained in more detail in conjunction with appended drawings, wherein.

DETAILED DESCRIPTION OF THE PREFERRED EMBODIMENT

A preferred embodiment of the invention will be described below in conjunction with the appended drawings.

Firstly, a duplex LC communication light detecting adapter in the preferred embodiment of the invention will be described.

Figure 1:
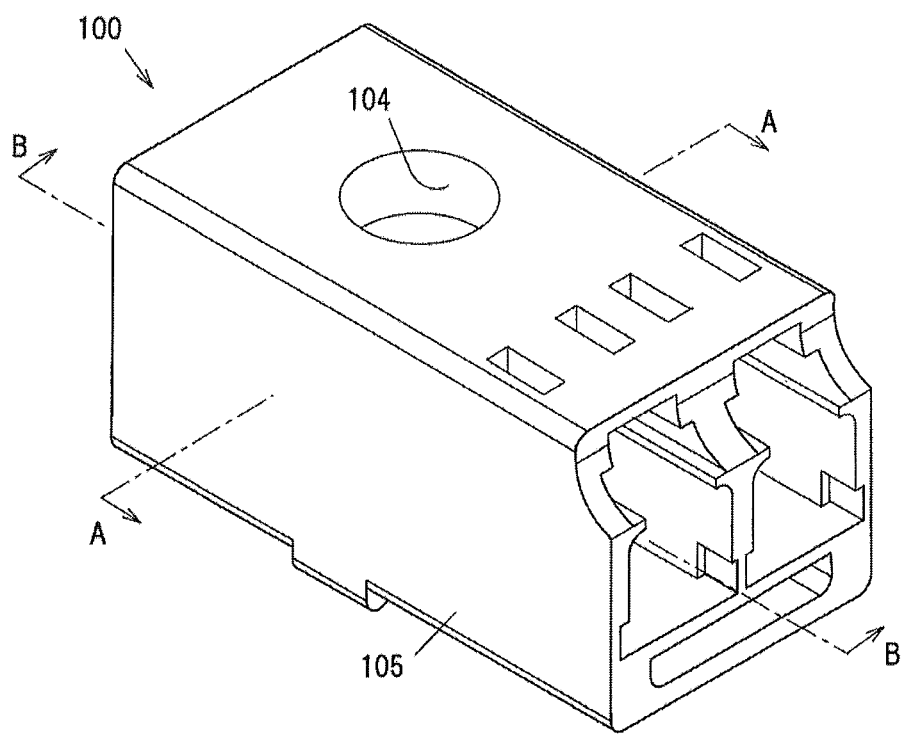
FIG. 1 is a perspective view showing a duplex LC communication light detecting adapter of the present invention.
Figure 2:
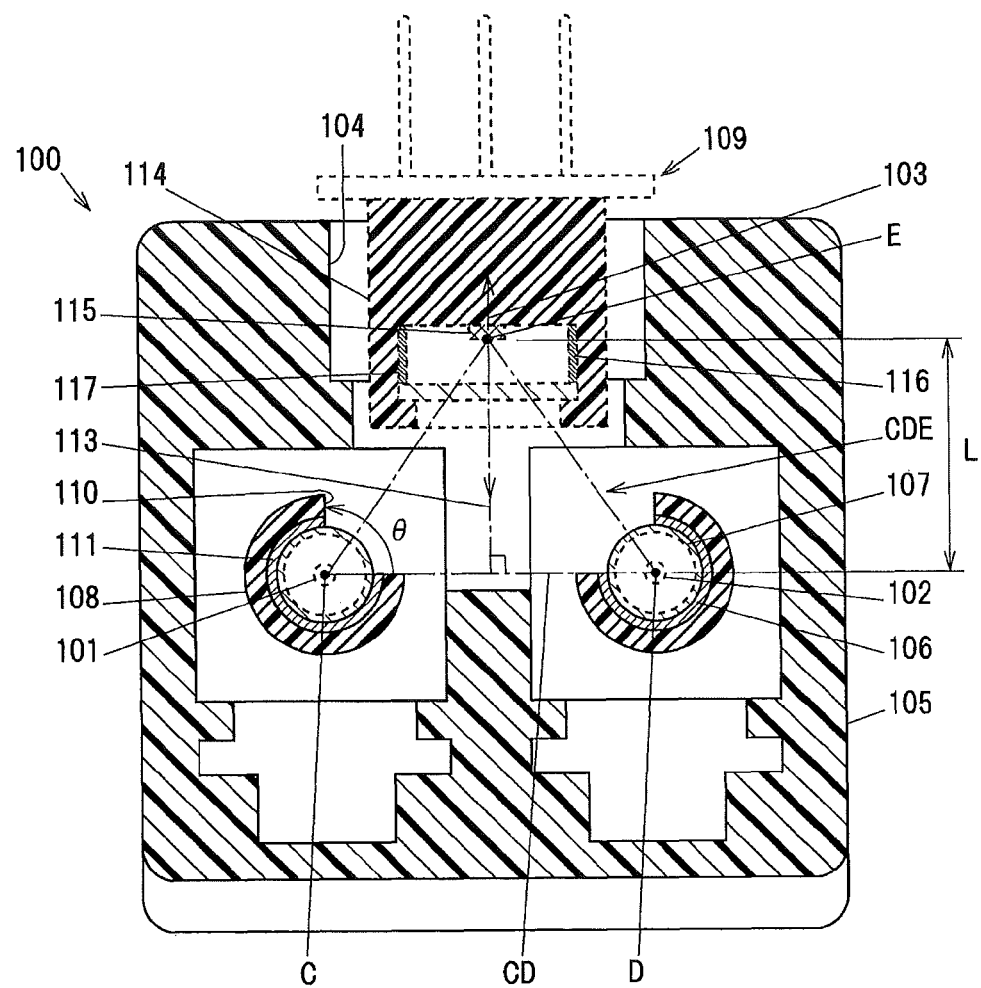
FIG. 2 is an A-A line cross sectional view showing the duplex LC communication light detecting adapter of the invention.
Figure 3:
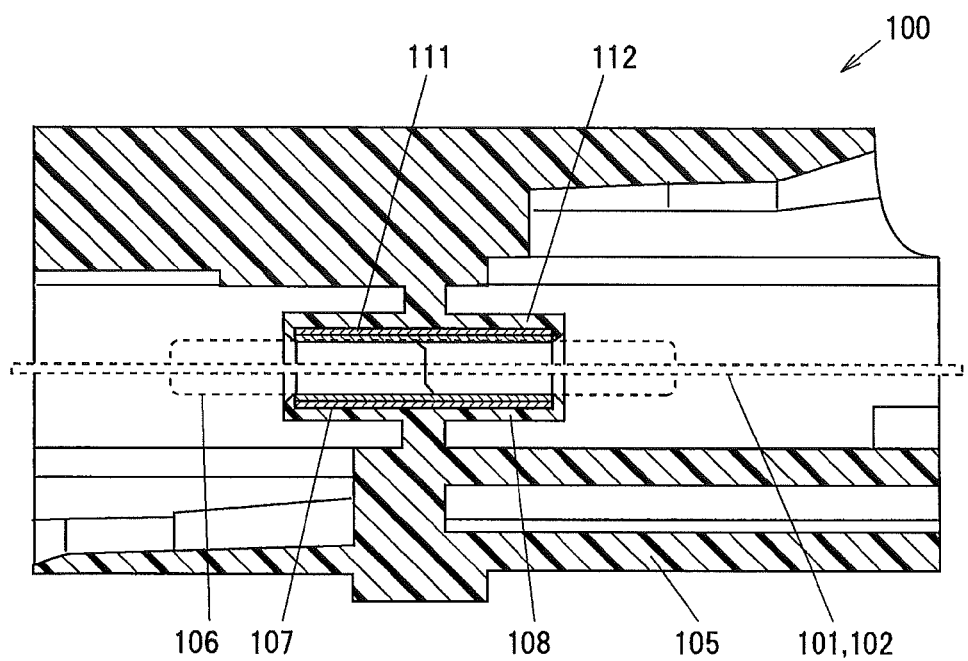
FIG. 3 is a B-B line cross sectional view showing the duplex LC communication light detecting adapter of the invention.

As shown in FIGS. 1 to 3, a duplex LC communication light detecting adapter 100 in the preferred embodiment of the invention is provided with an adapter main body 105 and sleeve holders 108. The adapter main body 105 is configured that two parallel optical transmission lines 101 and 102 are formed therein when duplex LC connectors are inserted, and the adapter main body 105 has a light extraction hole 104 located at a vertex E of a isosceles triangle CDE of which base is a line segment CD connecting the centers C and D of the two optical transmission lines 101 and 102 as viewed in a cross section (an A-A line cross section). The light extraction hole 104 opens in a direction 103 perpendicular to the line segment CD. The sleeve holders 108 are formed integrally with the adapter main body 105 to hold sleeves 107 which house ferrules 106 of the duplex LC connectors.

The duplex LC communication light detecting adapter 100 connects between duplex LC connectors, etc., inserted into end portions of the adapter main body 105 and has a function of extracting leak light toward a light-receiving element 109 through the light extraction hole 104 when a communication light detector (described later) is attached to the duplex LC communication light detecting adapter 100.

The duplex LC communication light detecting adapter 100 is formed by modifying a duplex LC adapter which is used for connecting duplex LC connectors, etc. In many cases, plural duplex LC communication light detecting adapters 100 are mounted on, e.g., a rack panel used in an optical communication-related equipment.

Each of the optical transmission lines 101 and 102 comprises an optical fiber made of quartz glass, etc., having an outer diameter of 125 µm. Each ferrule 106 comprises an LC ferrule made of zirconia, etc., having an outer diameter of 1.25 mm Each sleeve 107 comprises a split sleeve made of zirconia, etc., having an outer diameter of 1.78 mm. A length of the line segment CD (a distance between the two optical transmission lines 101 and 102) is 6.25 mm. These dimensions are in conformity with the standards of LC connector and LC adapter.

The light extraction hole 104 houses the light-receiving element 109 so that light other than leak light is blocked to prevent the light-receiving element 109 from receiving light other than the leak light and the communication state of the optical transmission lines from being checked incorrectly. Also, the light extraction hole 104 has a function of extracting the leak light toward the light-receiving element 109 during when the communication light detector is attached to the duplex LC communication light detecting adapter 100.

The leak light here means light which is a portion of communication light transmitting through an optical transmission line and is extracted to the outside of the optical transmission line through a light extraction portion formed in the midway of the optical transmission line.

As the light extraction portion, it is possible to use a known structure, e.g., a light detecting groove disclosed in JP-A-2009-145676, JP-A-2010-231082 and JP-A-2011-013359 or an off-axis portion disclosed in JP-A-2013-228678 but the detailed description thereof will be omitted herein.

The duplex LC communication light detecting adapter 100 may be further provided with a lid for closing the light extraction hole 104. This allows the light extraction hole 104 to be closed except when checking the communication state of the optical transmission lines and it is thereby possible to prevent a foreign body such as dust from entering the light extraction hole 104.

The sleeve holder 108 has an opening section 110 formed to open toward the light extraction hole 104 in a range θ of more than 30 degrees to less than 120 degrees (90 degrees in FIG. 2), more preferably not less than 60 degrees to not more than 90 degrees, the most preferably 90 degrees with reference to the line segment CD as viewed in a cross section (see FIG. 2). Since this allows leak light to be concentrated toward the light-receiving element 109, intensity of leak light to be detected by the light-receiving element 109 is increased and this allows the leak light to be detected with high sensitivity.

In addition, the sleeve holder 108 may have a light reflecting layer 111 formed on an inner surface thereof (see FIG. 2).

Furthermore, the sleeve holder 108 preferably has clip portions 112 to prevent the sleeve 107 from falling off (see FIG. 3). Thus, the sleeve 107 can be reliably held so as not to fall off of the sleeve holder 108 even though the sleeve holder 108 has the opening section 110.

The light-receiving element 109 is now described here. The light-receiving element 109 comprises a CAN-type photodiode which has a can body 114 opened in a light-receiving direction 113 and a light-receiving portion 115 housed in the can body 114.

In the CAN-type photodiode, the light-receiving portion 115 is sealed off by a sealing plate 116 transparent to the leak light and is thus hardly damaged by dust or humidity, etc., and is also less likely to be thermally affected than a typical photodiode in which the light-receiving portion 115 is sealed with a resin, etc. Therefore, the CAN-type photodiode is the most reliable among various photodiodes.

The can body 114 preferably has a light reflecting layer 117 formed on an inner surface thereof. Since the leak light extracted toward the can body 114 can be collected to the light-receiving portion 115 by the light reflecting layer 117, intensity of leak light to be detected by the light-receiving element 109 is further increased and this allows the leak light to be detected with higher sensitivity.

Figure 4:
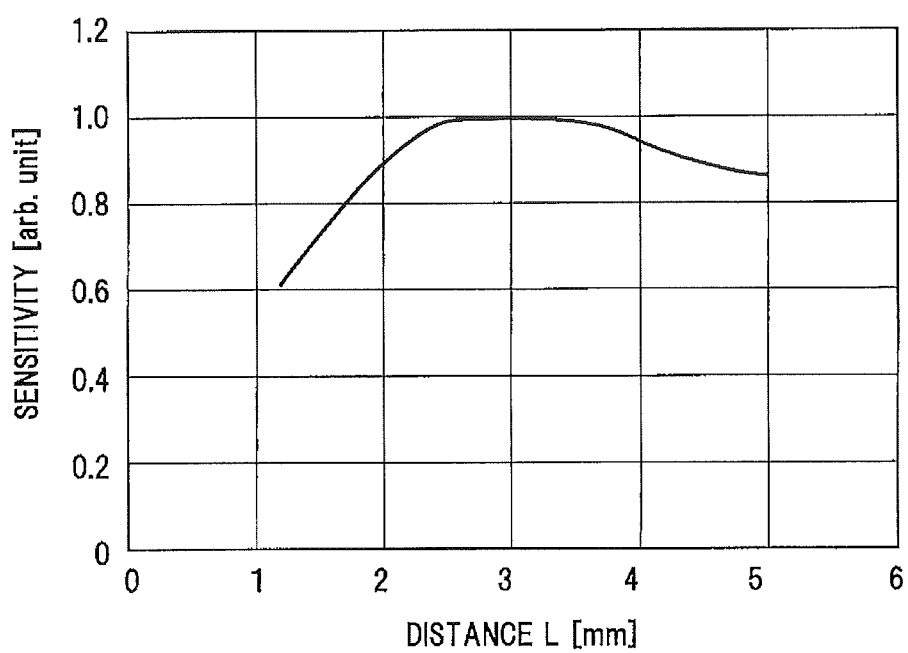
FIG. 4 is a diagram illustrating a relation between a distance L and detection sensitivity.

The light-receiving portion 115 is preferably arranged at a position with a distance L of not less than 2.8 mm and not more than 3.2 mm from the line segment CD. This allows a decrease in detection sensitivity to be suppressed up to 0.95 times of the highest detection sensitivity, as shown in FIG. 4. In other words, by arranging the light-receiving portion 115 at a position with the distance L of not less than 2.8 mm and not more than 3.2 mm from the line segment CD, it is possible to ensure that detection sensitivity is not less than 95% of the highest level.

The sealing plate 116 is preferably opaque to light other than the leak light. Since this allows the light-receiving portion 115 to be blocked from light other than the leak light and thus to reliably receive only the leak light, it is possible to check the communication state of the optical transmission lines more accurately.

Next, a duplex LC communication light detecting structure in the preferred embodiment of the invention will be described.

Figure 5:
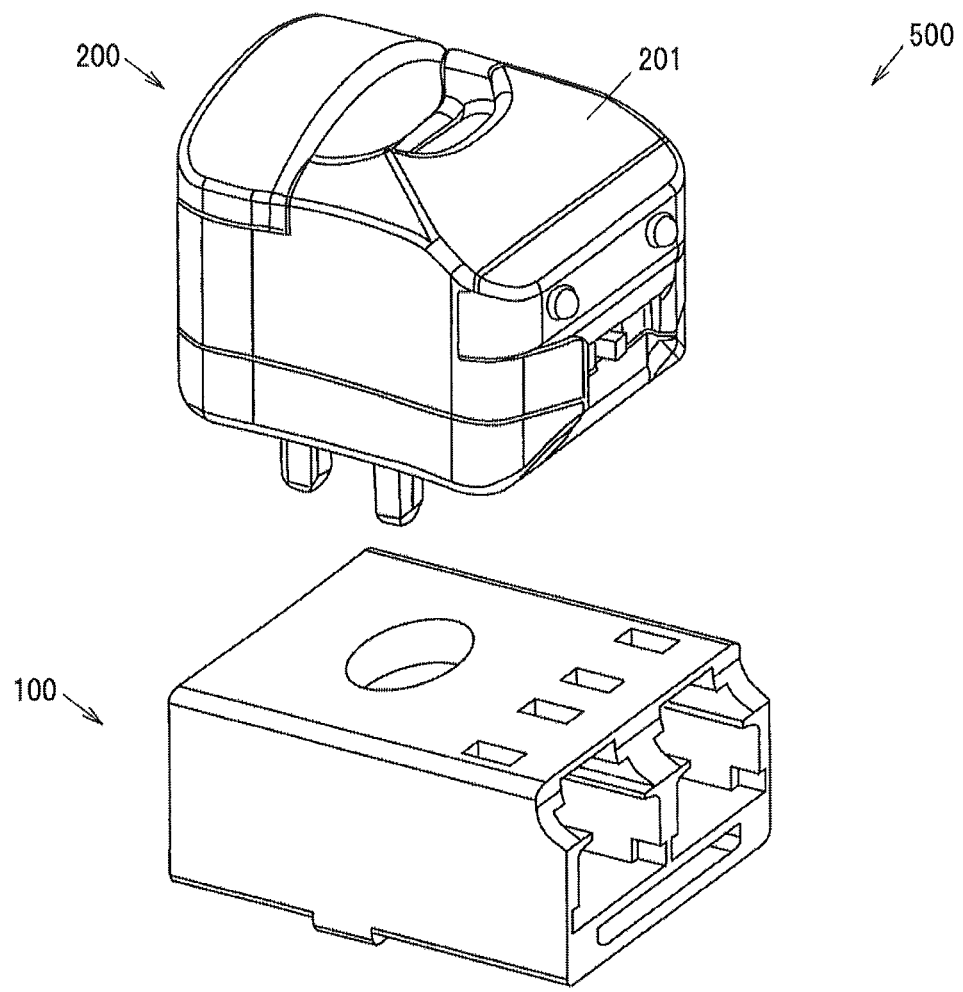
FIG. 5 is a perspective view showing a duplex LC communication light detecting structure of the invention.

As shown in FIG. 5, a duplex LC communication light detecting structure 500 in the preferred embodiment of the invention is provided with the duplex LC communication light detecting adapter 100 and the communication light detector 200 removably attached to the duplex LC communication light detecting adapter 100.

Figure 6:
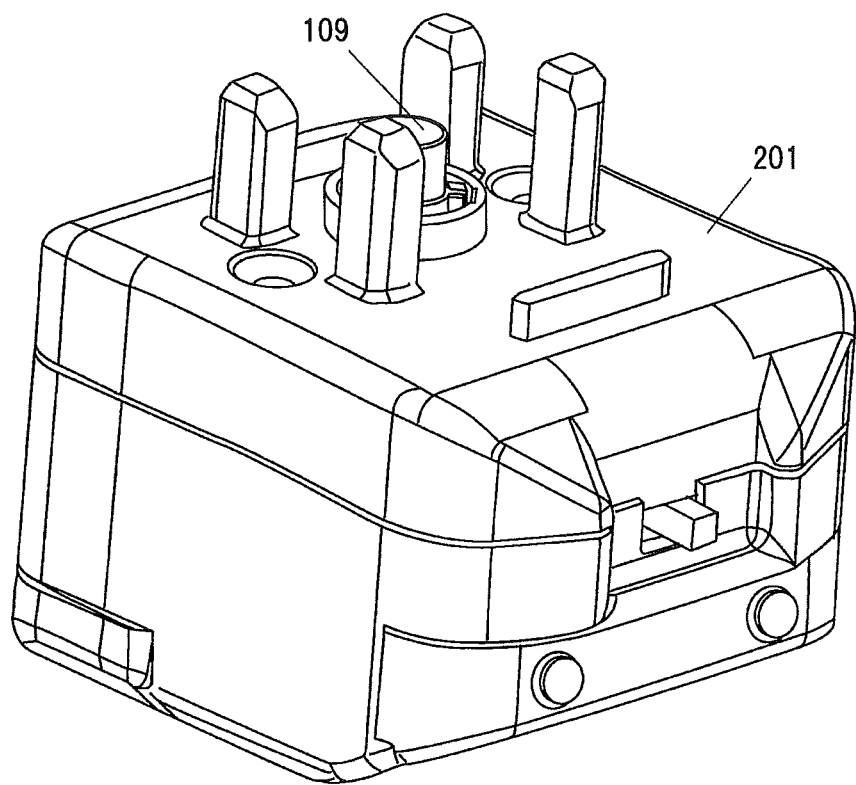
FIG. 6 is a perspective view showing a communication light detector as viewed from diagonally below.

As shown in FIG. 6, the communication light detector 200 has a detector main body 201 on which the light-receiving element 109 to be housed in the light extraction hole 104 is mounted. The conventionally known configuration can be adapted for the communication light detector 200 except the configuration of light-receiving element 109. However, such a configuration other than light-receiving element 109 will not be described in detail herein since it departs from the gist of the invention.

As described above, according to the invention, it is possible to provide the duplex LC communication light detecting adapter 100 and the duplex LC communication light detecting structure 500 which are compatible with duplex LC connectors, thus allows two optical transmission lines to be formed and also allows leak light to be detected with high sensitivity.

EXAMPLES

Next, examples of the invention will be described.

The angle of the opening section 110 of the sleeve holder 108 was changed to 30 degrees, 60 degrees, 90 degrees and 120 degrees to observe changes in detection sensitivity, sleeve retention capacity and connector connection stability. Table 1 shows the results.

TABLE 1

| Angle | Detection sensitivity | Sleeve retention capacity | Connector connection stability |
|---|---|---|---|
| 30 degrees | Unacceptable | Good | Good |
| 60 degrees | Acceptable | Good | Good |
| 90 degrees | Good | Good | Good |
| 120 degrees | Excellent | Unacceptable | Unacceptable |

As understood from Table 1, as the angle of the opening section 110 decreases, the sleeve 107 is more unlikely to fall off of the sleeve holder 108 and stability when connecting a duplex LC connector is improved but detection sensitivity decreases.

It is understood from these results that the sleeve holder 108 desirably has the opening section 110 formed to open toward the light extraction hole 104 in a range θ of more than 30 degrees to less than 120 degrees, more preferably not less than 60 degrees to not more than 90 degrees, the most preferably 90 degrees with reference to the line segment CD as viewed in a cross section.

Although the invention has been described with respect to the specific embodiment for complete and clear disclosure, the appended claims are not to be therefore limited but are to be construed as embodying all modifications and alternative constructions that may occur to one skilled in the art which fairly fall within the basic teaching herein set forth.

What is claimed is:

1. A duplex LC communication light detecting adapter, comprising:
    an adapter main body to form two parallel optical transmission lines therein when a duplex LC connector is inserted, the adapter main body comprising a side in which a light extraction hole is formed, the light extraction hole being located at a vertex of a isosceles triangle having a base that is a line segment connecting centers of the two optical transmission lines in a cross section and opened in a direction perpendicular to the line segment; and
    a sleeve holder formed integrally with the adapter main body to hold a sleeve that houses a ferrule of the duplex LC connector,
    wherein the sleeve holder comprises an opening section that is opened toward the light extraction hole in a range of more than 30 degrees to less than 120 degrees relative to the line segment in a cross section.

2. The duplex LC communication light detecting adapter according to claim 1, wherein the sleeve holder comprises a light reflecting layer formed on an inner surface thereof.

3. The duplex LC communication light detecting adapter according to claim 1, wherein the sleeve holder comprises a clip portion to prevent the sleeve from falling off.

4. A duplex LC communication light detecting structure, comprising:
    a duplex LC communication light detecting adapter; and
    a communication light detector removably attached to the duplex LC communication light detecting adapter,
    wherein the duplex LC communication light detecting adapter comprises:
    an adapter main body to form two parallel optical transmission lines therein when a duplex LC connector is inserted, the adapter main body comprising a side in which a light extraction hole is formed, the light extraction hole being located at a vertex of a isosceles triangle having a base that is a line segment connecting centers of the two optical transmission lines in a cross section and opened in a direction perpendicular to the line segment; and
    a sleeve holder formed integrally with the adapter main body to hold a sleeve that houses a ferrule of the duplex LC connector,
    wherein the sleeve holder comprises an opening section that is opened toward the light extraction hole in a range of more than 30 degrees to less than 120 degrees relative to the line segment in a cross section, and
    wherein the communication light detector comprises a detector main body mounting a light-receiving element to be housed in the light extraction hole.

5. The duplex LC communication light detecting structure according to claim 4, wherein the light-receiving element comprises a CAN-type photodiode comprising a can body opened in a light-receiving direction and a light-receiving portion housed in the can body.

6. The duplex LC communication light detecting structure according to claim 4, wherein the light-receiving portion is arranged at a position with a distance of not less than 2.8 mm and not more than 3.2 mm from the line segment.

7. The duplex LC communication light detecting structure according to claim 4, wherein the can body comprises a light reflecting layer formed on an inner surface thereof.

* * * * *